(12) United States Patent
Bleakley et al.

(10) Patent No.: US 10,510,103 B2
(45) Date of Patent: *Dec. 17, 2019

(54) ON-LINE SHOPPING ASSISTANT FOR IN-STORE SHOPPING

(71) Applicant: International Business Machines Corporation, Armonk, NY (US)

(72) Inventors: Darrell O. Bleakley, Raleigh, NC (US); Louis M. Demmler, Pittsburgh, PA (US); Aditya A. Desai, Morrisville, NC (US); Michael P. Etgen, Cary, NC (US); Stephen Kenna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1205 days.

This patent is subject to a terminal disclaimer.

(21) Appl. No.: 14/710,589

(22) Filed: May 13, 2015

(65) Prior Publication Data

US 2016/0098772 A1  Apr. 7, 2016

Related U.S. Application Data

(63) Continuation of application No. 14/507,048, filed on Oct. 6, 2014.

(51) Int. Cl.
*G06Q 30/00* (2012.01)
*G06Q 30/06* (2012.01)
(Continued)

(52) U.S. Cl.
CPC ..... *G06Q 30/0623* (2013.01); *G06Q 30/0639* (2013.01); *G06Q 30/0641* (2013.01); *H04W 4/043* (2013.01); *H04W 4/33* (2018.02)

(58) Field of Classification Search
CPC ............... G06Q 30/00; G06Q 30/0601; G06Q 30/0631; G06Q 30/0633; G06Q 30/0641
See application file for complete search history.

(56) References Cited

U.S. PATENT DOCUMENTS 6,963,851 B1 * 11/2005 Szabo .................... G06Q 30/02
186/56
7,979,309 B1 * 7/2011 Stevens ................ G06Q 10/087
705/26.8

(Continued)

OTHER PUBLICATIONS

Sharma, Navin Kumar. "A weighted center of mass based trilateration approach for locating wireless devices in indoor environment." Proceedings of the 4th ACM international workshop on Mobility management and wireless access. ACM, 2006. (Year: 2006).*

*Primary Examiner* — Christopher B Seibert
(74) *Attorney, Agent, or Firm* — Steven M. Greenberg, Esq.; Shutts & Bowen LLP

(57) ABSTRACT

Embodiments of the present invention provide a method, system and computer program product for an on-line shopping assistant for in-store shopping. In an embodiment of the invention, a method for managing an on-line shopping assistant for in-store shopping is provided. The method includes locating an in-store shopper in a portion of a store by locating a mobile device registered in a database in association with the in-store shopper. The method also includes receiving a request for data through the mobile device pertaining to at least one item in the store and filtering the requested data based upon the location of the in-store shopper in the portion of the store. Finally, the method includes presenting the filtered data in a display of the mobile device.

6 Claims, 1 Drawing Sheet

(51) Int. Cl.
*H04W 4/04* (2009.01)
*H04W 4/33* (2018.01)

(56) References Cited

U.S. PATENT DOCUMENTS

| | | |
|---|---|---|
| 8,199,966 B2 | 6/2012 | Guven et al. |
| 2006/0178947 A1* | 8/2006 | Zsigmond ................ B07C 5/34 |
| | | 705/26.1 |
| 2007/0179867 A1* | 8/2007 | Glazer ............... G06Q 30/0253 |
| | | 705/26.43 |
| 2008/0195641 A1* | 8/2008 | Tischer ................. G06Q 30/04 |
| 2009/0088203 A1* | 4/2009 | Havens ............. G06K 7/10881 |
| | | 455/556.1 |
| 2010/0070369 A1* | 3/2010 | Fenton ............. G06Q 20/3224 |
| | | 705/14.58 |
| 2012/0190386 A1* | 7/2012 | Anderson .............. G01C 15/04 |
| | | 455/456.3 |
| 2012/0233003 A1* | 9/2012 | Calman ................. G06Q 30/06 |
| | | 705/16 |
| 2012/0239504 A1 | 9/2012 | Curlander et al. |
| 2012/0303480 A1* | 11/2012 | Stone .................... G06Q 30/00 |
| | | 705/26.8 |
| 2012/0316989 A1* | 12/2012 | Wong .................... G06Q 30/06 |
| | | 705/26.9 |
| 2013/0030915 A1 | 1/2013 | Statler et al. |
| 2013/0262995 A1* | 10/2013 | Howell ............... G06Q 10/087 |
| | | 715/273 |
| 2014/0067564 A1* | 3/2014 | Yuan .................. G06Q 30/0633 |
| | | 705/16 |
| 2014/0344011 A1* | 11/2014 | Dogin .................... G06Q 20/12 |
| | | 705/7.29 |
| 2015/0029339 A1* | 1/2015 | Kobres ................. H04N 7/181 |
| | | 348/150 |
| 2015/0294390 A1* | 10/2015 | Fan .................... G06Q 30/0605 |
| | | 705/26.4 |

* cited by examiner

ON-LINE SHOPPING ASSISTANT FOR IN-STORE SHOPPING

BACKGROUND OF THE INVENTION

Field of the Invention

The present invention relates to e-commerce systems and more particularly to in-store tools supporting in-store shopping.

Description of the Related Art

Electronic commerce or e-commerce is a term generally used for any type of business, or commercial transaction, that involves the transfer of information across the Internet. The backbone of e-commerce is online shopping. Online shopping virtualizes the traditional in-store shopping experience by providing a view to a "store" through a Web browser and a virtualized shopping cart into which the online shopper may place selected items for purchase. At the convenience of the online shopper, the cart can be processed during checkout, payment received and delivery of the purchased items.

Unlike the in-store shopping experience, in an online shopping environment, the entirety of a virtual store can be accessed by the online shopper with little more than a few keystrokes and mouse clicks. Navigating the items available for purchase in the online store requires the use of one of several convenient tools, such as a search interface, or a browsable catalog, often organized hierarchically for the convenience of the online shopper. Desired information pertaining to a product of interest can be obtained by the online shopper either through embedded information provided at the online store, or externally through third-party Web sites. Thus, online shopping provides a wealth of convenience for the ordinary online shopper.

Much of the convenience of online shopping, however, is not present in the environment of in-store shopping. In this regard, as a matter of practicality, short of performing online shopping whilst present in the store, navigating the items available for purchase requires the physical movement of the in-store shopper throughout the store and presupposes the in-store shopper is aware of the location of all desired items in the store. Obtaining desired information regarding an item depends heavily on the presence of a sales associate within the store and positionally proximate to the in-store shopper. Yet, as is commonly understood, not all stores are staffed with enough sales associates to provide real-time on demand sales assistance when sought by an in-store shopper.

BRIEF SUMMARY OF THE INVENTION

Embodiments of the present invention address deficiencies of the art in respect to in-store shopping support and provide a novel and non-obvious method, system and computer program product for an on-line shopping assistant for in-store shopping. In an embodiment of the invention, a method for managing an on-line shopping assistant for in-store shopping is provided. The method includes locating an in-store shopper in a portion of a store by locating a mobile device registered in a database in association with the in-store shopper. The method also includes receiving a request for data through the mobile device pertaining to at least one item in the store and filtering the requested data based upon the location of the in-store shopper in the portion of the store. Finally, the method includes presenting the filtered data in a display of the mobile device.

In one aspect of the embodiment, the requested data is a location of a requested item within the store and the filter data is directions to the location of the requested item based upon the location of the in-store shopper in the portion of the store. In another aspect of the embodiment, the requested data is product information pertaining to a product and the filtered data is product information positioned proximately to the location of the in-store shopper. In yet another aspect of the embodiment, the in-store shopper is located based detecting a hardware address of the mobile device in a wireless network request presented by the mobile device to one of three wireless access points disposed in the store, and subsequently by triangulating the position according to the three wireless access points. Alternatively, the in-store shopper is located based detecting a hardware address of the mobile device in a wireless network request presented by the mobile device to a wireless access point disposed in the store, and subsequently by receiving from the mobile device global positioning system (GPS) data.

In another embodiment of the invention, an in-store shopping data processing system is configured to provide an on-line shopping assistant for in-store shopping. The system includes a host computing system disposed in a store. The system includes one or more computers each with memory and at least one processor and at least one wireless access point coupled to the host computing system and positioned with the store. The system also includes a database coupled to the host computing system that stores records correlating different in-store shoppers with respectively different mobile devices. Finally, the system includes a shopping assistant module executing in the memory of the host computing system. The module includes program code enabled upon execution in the memory to locate one of the in-store shoppers in a portion of the store by locating a corresponding one of the mobile devices for the one of the in-store shoppers, to receive a request for data through the mobile device pertaining to at least one item in the store, to filter the requested data based upon the location of the in-store shopper in the portion of the store, and to present the filtered data in a display of the mobile device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for an on-line shopping assistant for in-store shopping. In accordance with an embodiment of the invention, an in-store shopper can be determined to be present within a store based upon detecting a presence of a mobile device of the in-store shopper within the store. Throughout the store, the in-store shopper can be located based upon locating the mobile device. Thereafter, information provided to the in-store shopper in respect to items in the store can be filtered in accordance with the location of the in-store shopper. For example, relevant information pertaining to a product proximate to the in-store shopper can be presented in a display of the mobile device, or navigation instructions leading from the location of the in-store shopper within the store to a desired item within the store can be presented in the display of the mobile device.

Figure 1:
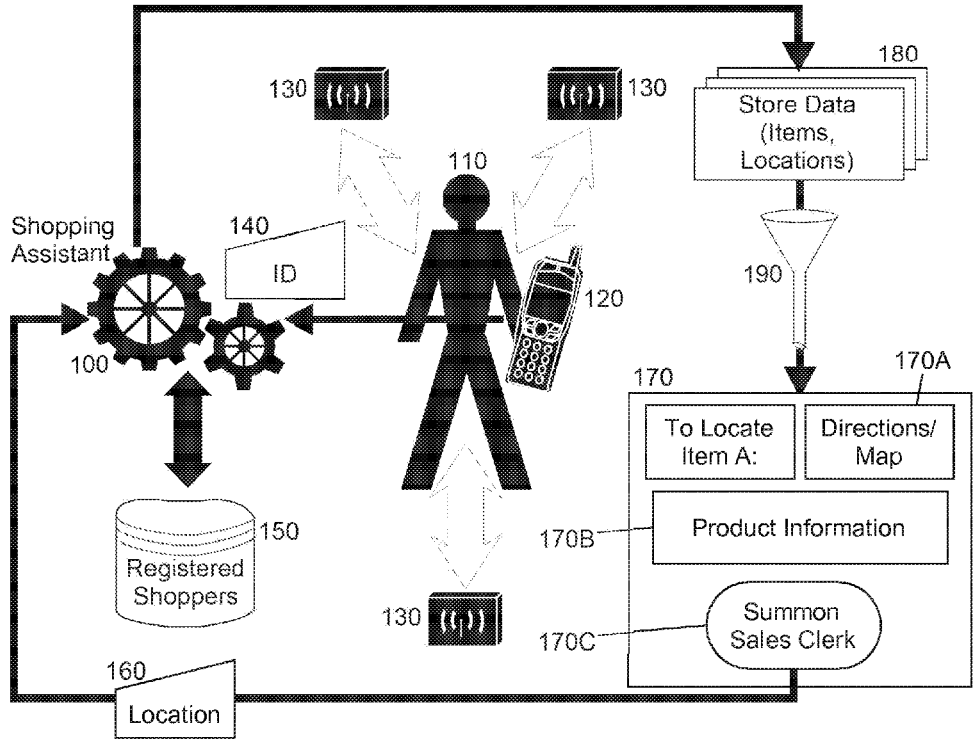
FIG. 1 is a pictorial illustration of an on-line shopping assistant for in-store shopping.

In further illustration, FIG. 1 pictorially shows an on-line shopping assistant for in-store shopping. As shown in FIG. 1, an in-store shopper 110 can enter a store with a corresponding mobile device 120. The in-store shopper 110 can be identified by shopping assistant logic 100 based upon an identifier 140 accessible in the mobile device 120, for instance a hardware address of the mobile device 120. The shopping assistant logic 100 can compare the identifier 140 to a database of registered shoppers 150 in order to determine whether or not the in-store shopper 110 has been registered to access the shopping assistant logic 100.

Once the shopping assistant logic 100 has verified the identity of the in-store shopper 110, the shopping assistant logic 100 can locate the in-store shopper 110 within the store. For instance, three different wireless access points 130 in the store communicating with the mobile device 120 can triangulate the position of the mobile device 120. Alternatively, positioning data provided by GPS circuitry on the mobile device 120 can report its position to the shopping assistant logic. As even a further alternative, the wireless access point 130 reporting a strongest signal of the mobile device 120 can presume the location of the mobile device 120 to be proximate to the reporting wireless access point 130.

Based upon the location of the in-store shopper 110 in the store, the shopping assistant 100 can respond to queries from the in-store shopper in respect to items in the store 180 by applying a filter 190 to the result set of the queries to only those items in proximity to the in-store shopper. In this regard, a display 170 can be provided for the mobile device 120. The display 170 can include any combination of a portion 170A providing navigation instructions or a map within the store, a portion 170B for product information, and a portion 170C activatable to summon the presence of a sales clerk. In response to a request to locate an item in the store, directions can be presented in portion 170A leading the in-store shopper 110 from the determined location of the in-store shopper 110 to the location of the item in the store. Further, in response to a request for product information, only information pertinent to proximate items of the store can be presented in the portion 170B. Finally, in response to the activation of the portion 170C, a message with location 160 of the in-store shopper 110 can be transmitted to the shopping assistant 100 which in turn can be used to alert a sales clerk of the necessity to assist the in-store shopper 110 as the location 160.

Figure 2:
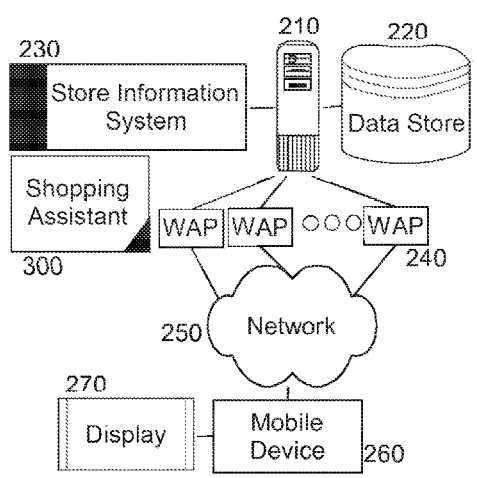
FIG. 2 is a schematic illustration of an e-commerce data processing system configured for managing an on-line shopping assistant for in-store shopping; and, FIG. 3 is a flow chart illustrating a process for managing an on-line shopping assistant for in-store shopping.

The process described in connection with FIG. 1 can be implemented in an e-commerce data processing system. In further illustration, FIG. 2 schematically shows an e-commerce data processing system configured for managing an on-line shopping assistant for in-store shopping. The system can include a host computing system 210 that can include one or more computers, each with memory and at least one processor. The host computing system can support the operation of a store information system 230 providing queryable access to a data store 220 of data pertaining to a store, such as information regarding items displayed in the store, and navigation instructions for navigating the store from one point to another.

Multiple different wireless access points 240 can be coupled to the host computing system 210 and can provide access to a data communications network 250 to a mobile device 260 present in proximity to the wireless access points 240. In this way, the mobile device 260 not only can communicate with the store information system 230 over the data communications network 250, but also the mobile device 260 can be located within the store through the operation of the communication between the mobile device 260 and the wireless access points 240.

A shopping assistant module 300 can be coupled to the store information system 230. The shopping assistant module 300 can include program code that when executed in the memory of the host computing system 210 can be enabled to determine a location of the mobile device 260 within the store and, based upon the location of the mobile device 260, filter access to data in the data store 220 as requested by the mobile device 260. For example, a request to access data regarding items can be limited to only those items proximate to the location of the mobile device 260. As another example, a request to locate an item in the store can result in the presentation of in-store directions in a display 270 of the mobile device 260 based upon a contemporaneous location of the mobile device 260.

Figure 3:
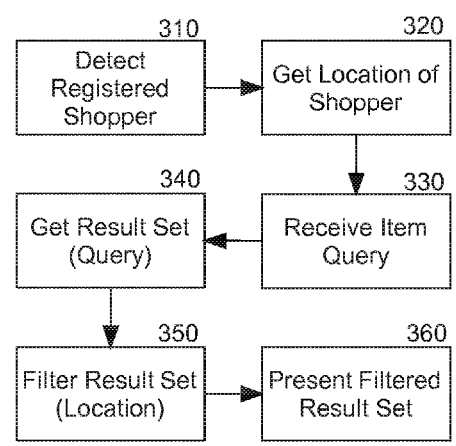

In even yet further illustration of the operation of the shopping assistant module 300, FIG. 3 is a flow chart illustrating a process for managing an on-line shopping assistant for in-store shopping. Beginning in block 310, a registered shopper can be detected within a store and in block 320, a location of the shopper can be determined within the store. In block 330, an item query can be received from the registered shopper and in block 340. For example, the item query can be a request for product information, or a request to locate a product in the store, or a request for directions to navigate to a desired item in the store. Thereafter, a result set of the query can be filtered in respect to the location of the shopper so as to limit the result set to only data that is relevant to the location of the shopper. Finally, in block 360 the filtered result set can be presented in a display of a mobile device of the in-store shopper.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for managing an on-line shopping assistant for in-store shopping, the method comprising:

locating, in a store, a mobile device registered in a database in association with an in-store shopper, said locating comprising comparing a wireless signal of the mobile device with a plurality of wireless access points in communication with the mobile device and selecting a location in correspondence to one of the wireless access points associated with a strongest wireless signal as compared to others of the wireless access points;

receiving a request for data through the mobile device pertaining to at least one item in the store;

filtering the requested data to only data relating to items in proximity to the in-store shopper at the location within the store while excluding data relating to items not in proximity to the in-store shopper; and, presenting the filtered data in a display of the mobile device along with an activatable button transmitting a request to summon a sales clerk to the location of the in-store shopper and also an activatable button transmitting a request to display a map of the store and direction in the store to locate a desired one of the items in proximity to the in-store shopper.

2. The method of claim 1, wherein the requested data is a location of a requested item within the store and the filter data is directions to the location of the requested item based upon the location of the in-store shopper in the portion of the store.

3. The method of claim 1, wherein the requested data is product information pertaining to a product and the filtered data is product information positioned proximately to the location of the in-store shopper.

4. The method of claim 1, wherein the in-store shopper is located based detecting a hardware address of the mobile device in a wireless network request presented by the mobile device to one of three wireless access points disposed in the store, and subsequently by triangulating the position according to the three wireless access points.

5. The method of claim 1, wherein the in-store shopper is located based detecting a hardware address of the mobile device in a wireless network request presented by the mobile device to a wireless access point disposed in the store, and subsequently by receiving from the mobile device global positioning system (GPS) data.

6. The method of claim 1, further comprising receiving a request from the mobile device to summon a sales associate at the location of the in-store shopper determined based upon a location of the mobile device in the store.

* * * * *